(12) United States Patent
Abraham et al.

(10) Patent No.: US 9,001,693 B2
(45) Date of Patent: Apr. 7, 2015

(54) ENHANCED DISCOVERY PROCEDURES IN PEER-TO-PEER WIRELESS LOCAL AREA NETWORKS (WLANS)

(75) Inventors: Santosh Paul Abraham, San Diego, CA (US); Hemanth Sampath, San Diego, CA (US); Vincent Knowles Jones, IV, Redwood City, CA (US); Avneesh Agrawal, San Diego, CA (US); Junyi Li, Chester, NJ (US)

(73) Assignee: QUALCOMM, Incorporated, San Diego, CA (US)

(*) Notice: Subject to any disclaimer, the term of this patent is extended or adjusted under 35 U.S.C. 154(b) by 176 days.

(21) Appl. No.: 13/494,498

(22) Filed: Jun. 12, 2012

(65) Prior Publication Data

US 2013/0148642 A1 Jun. 13, 2013

Related U.S. Application Data

(60) Provisional application No. 61/496,509, filed on Jun. 13, 2011.

(51) Int. Cl.
*H04L 12/28* (2006.01)
*H04W 4/00* (2009.01)
*G06F 15/16* (2006.01)
*H04W 84/12* (2009.01)
*H04W 8/00* (2009.01)
*H04W 76/02* (2009.01)

(52) U.S. Cl.
CPC ............. *H04W 84/12* (2013.01); *H04W 8/005* (2013.01); *H04W 76/023* (2013.01); *Y02B 60/50* (2013.01)

(58) Field of Classification Search
CPC ....... H04W 8/00; H04W 8/005; H04W 84/12; H04W 76/00; H04W 76/02; H04W 76/022; H04W 76/023; H04W 76/028; H04W 76/043; H04W 76/045

USPC .......... 370/310–350, 395.2, 395.4, 400–401, 370/449, 229–240, 252, 254–258; 455/414.1, 422.1, 426.1, 434, 455/446–448, 458; 709/220–222, 227–244
See application file for complete search history.

(56) References Cited

U.S. PATENT DOCUMENTS 7,065,579 B2 * 6/2006 Traversat et al. ............. 709/230
7,167,920 B2 * 1/2007 Traversat et al. ............. 709/230
(Continued)

FOREIGN PATENT DOCUMENTS

EP 1804437 A1 7/2007
EP 2312903 A1 4/2011

OTHER PUBLICATIONS

IEEE 802.11 "Part 11: Wireless LAN Medium Access Control (MAC) and Physical Layer (PHY) Specifications", Mar. 2012, pp. 1-2793.

(Continued)

*Primary Examiner* — Tri H Phan
(74) *Attorney, Agent, or Firm* — Dang M. Vo

(57) ABSTRACT

Certain aspects of the present disclosure generally provide methods and apparatus for enhanced discovery procedures in peer-to-peer (P2P) wireless local area networks (WLANs). With these procedures, discovery duration may be decreased, battery power consumption may be reduced during discovery, provided services may be ascertained during the device discovery phase without performing a separate service discovery phase, and/or the discovery range may be extended in an effort to discover a greater number of devices.

58 Claims, 8 Drawing Sheets

(56) References Cited

U.S. PATENT DOCUMENTS

| | | | |
|---|---|---|---|
| 7,197,565 B2* | 3/2007 | Abdelaziz et al. | 709/226 |
| 7,340,500 B2* | 3/2008 | Traversat et al. | 709/201 |
| 7,522,640 B2* | 4/2009 | Date et al. | 370/507 |
| 7,574,523 B2* | 8/2009 | Traversat et al. | 709/238 |
| 7,613,156 B2* | 11/2009 | Rittle et al. | 370/338 |
| 7,774,495 B2* | 8/2010 | Pabla et al. | 709/238 |
| 8,037,202 B2* | 10/2011 | Yeager et al. | 709/238 |
| 8,437,275 B2* | 5/2013 | Banerjee et al. | 370/254 |
| 8,892,115 B2* | 11/2014 | Zeira et al. | 455/454 |
| 2005/0190796 A1 | 9/2005 | Date et al. | |
| 2006/0050826 A1 | 3/2006 | Date et al. | |
| 2006/0089964 A1 | 4/2006 | Pandey et al. | |
| 2007/0141984 A1 | 6/2007 | Kuehnel et al. | |
| 2007/0171910 A1 | 7/2007 | Kumar et al. | |
| 2007/0211678 A1 | 9/2007 | Li et al. | |
| 2008/0062945 A1 | 3/2008 | Ahuja et al. | |
| 2009/0016232 A1* | 1/2009 | Kwon et al. | 370/252 |
| 2010/0165882 A1 | 7/2010 | Palanki et al. | |
| 2010/0172338 A1 | 7/2010 | Chou et al. | |
| 2010/0254308 A1 | 10/2010 | Laroia et al. | |
| 2010/0271959 A1 | 10/2010 | Qi et al. | |
| 2011/0082940 A1 | 4/2011 | Montemurro et al. | |
| 2011/0103264 A1 | 5/2011 | Wentink | |
| 2011/0149798 A1 | 6/2011 | Cordeiro et al. | |
| 2011/0161697 A1 | 6/2011 | Qi et al. | |
| 2011/0258313 A1* | 10/2011 | Mallik et al. | 709/224 |
| 2011/0268101 A1* | 11/2011 | Wang et al. | 370/344 |
| 2012/0163235 A1* | 6/2012 | Ho et al. | 370/254 |
| 2013/0083779 A1* | 4/2013 | Ahn et al. | 370/336 |
| 2013/0148545 A1* | 6/2013 | Jung et al. | 370/255 |
| 2013/0148557 A1* | 6/2013 | Sampath et al. | 370/311 |
| 2013/0148643 A1* | 6/2013 | Abraham et al. | 370/338 |

OTHER PUBLICATIONS

Akyildiz, I.F., et al., "NeXt generation/dynamic spectrum access/cognitive radio wireless networks: A survey", Computer Networks, Elsevier Science Publishers B.V., Amsterdam, NL, vol. 50, No. 13, Sep. 15, 2006, pp. 2127-2159, XP028042158, ISSN: 1389-1286, DOI: 10.1016/J.COMNET.2006.05.001 [retrieved on Sep. 15, 2006].

International Search Report and Written Opinion—PCT/US2012/042303—ISA/EPO—Feb. 18, 2013.

Anonymous: "IEEE Standard for Technology—Telecommunications information exchange between systems—Local and metropolitan area networks—Specific requirements Part 11: Wireless LAN Medium Access Control (MAC) and Physical Layer (PHY) specifications Amendment 7: Extensions to Direct-Link Setup ( D" IEEE Standard, IEEE, Piscataway, NJ, USA, Oct. 14, 2010, pp. 1-X11,1, XP002617166, DOI: 10.1109/IEEESTD.2010.5605400, ISBN: 978-0-7381-6499-1, Retrieved from the Internet: URL:http://standards.ieee.org/getieee802/download/802.11z-2010.pdf [retrieved on Jan. 17, 2011]. pp. 17-18, 23-37, 74-82.

* cited by examiner

ENHANCED DISCOVERY PROCEDURES IN PEER-TO-PEER WIRELESS LOCAL AREA NETWORKS (WLANS)

CROSS-REFERENCE TO RELATED APPLICATIONS

This application claims benefit of U.S. Provisional Patent Application Ser. No. 61/496,509, filed Jun. 13, 2011, which is herein incorporated by reference. This application is related to U.S. patent application Ser. No. 13/494,522, filed herewith and entitled "ENHANCED DISCOVERY PROCEDURES IN PEER-TO-PEER WIRELESS LOCAL AREA NETWORKS (WLANs)."

BACKGROUND

1. Field of the Invention

Certain aspects of the present disclosure generally relate to wireless communications and, more particularly, to discovery in peer-to-peer (P2P) wireless local area networks (WLANs).

2. Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A peer-to-peer (P2P) wireless network is designed to operate in a manner where all devices share a common wireless resource (e.g., spectrum) for both receive and transmit operations (e.g., time-division duplex scheme). A key objective of the P2P network is to facilitate discovery, i.e., the act of discovering devices in the radio frequency (RF) vicinity that a terminal can make a connection with (i.e., receive from and transmit to). The interconnection of P2P devices constitutes the network.

SUMMARY

Certain aspects of the present disclosure generally relate to enhanced discovery procedures in peer-to-peer (P2P) wireless local area networks (WLANs). With these procedures, discovery duration may be decreased, battery power consumption may be reduced during discovery, provided services may be ascertained during the device discovery phase without entering a separate service discovery phase, and/or the discovery range may be extended in an effort to discover a greater number of devices.

Certain aspects of the present disclosure provide a first apparatus for wireless communications. The first apparatus generally includes a processing system and a transceiver. The processing system is typically configured to wake up the first apparatus at a particular time for a discovery period and to discover one or more second apparatuses during the discovery period, wherein the discovery period is common among the first and apparatuses. The transceiver is typically configured to communicate directly with at least one of the discovered second apparatuses independent of using a central node.

Certain aspects of the present disclosure provide a method for wireless communications. The method generally includes waking up at a particular time for a discovery period, discovering one or more apparatuses during the discovery period, wherein the discovery period is common among the apparatuses, and communicating directly with at least one discovered apparatus independent of using a central node.

Certain aspects of the present disclosure provide a first apparatus for wireless communications. The first apparatus generally includes means for waking up the first apparatus at a particular time for a discovery period, means for discovering one or more second apparatuses during the discovery period, wherein the discovery period is common among the first and second apparatuses, and means for communicating directly with at least one discovered second apparatus independent of using a central node.

Certain aspects of the present disclosure provide a computer-program product for wireless communications. The computer-program product generally includes a computer-readable medium having instructions executable to wake up at a particular time for a discovery period, discover one or more apparatuses during the discovery period, wherein the discovery period is common among the apparatuses, and to communicate directly with at least one of the discovered apparatuses independent of using a central node.

Certain aspects of the present disclosure provide a wireless node. The wireless node generally includes at least one antenna; a processing system configured to wake up at a particular time for a discovery period and to discover one or more apparatuses during the discovery period, wherein the discovery period is common among the apparatuses; and a transceiver configured to communicate directly with at least one of the discovered apparatuses, via the at least one antenna, independent of using a central node.

Certain aspects of the present disclosure provide a first apparatus for wireless communications. The first apparatus generally includes a receiver configured to receive a message comprising first information about (a service provided by or an application available at) a second apparatus and second information about the second apparatus for discovery, a processing system configured to discover the second apparatus based on the message, and a transmitter configured to communicate directly with the second apparatus independent of using a central node.

Certain aspects of the present disclosure provide a method for wireless communications. The method generally includes receiving a message comprising first information about (a service provided by or an application available at) an apparatus and second information about the apparatus for discovery, discovering the apparatus based on the message, and communicating directly with the apparatus independent of using a central node.

Certain aspects of the present disclosure provide a first apparatus for wireless communications. The first apparatus generally includes means for receiving a message comprising first information about (a service provided by or an application available at) a second apparatus and second information about the second apparatus for discovery, means for discovering the second apparatus based on the message, and means for communicating directly with the second apparatus independent of using a central node.

Certain aspects of the present disclosure provide a computer-program product for wireless communications. The computer-program product generally includes a computer-readable medium having instructions executable to receive a message comprising first information about (a service provided by or an application available at) an apparatus and second information about the apparatus for discovery, to discover the apparatus based on the message, and to communicate directly with the apparatus independent of using a central node.

Certain aspects of the present disclosure provide a wireless node. The wireless node generally includes at least one antenna; a receiver configured to receive, via the at least one antenna, a message comprising first information about (a service provided by or an application available at) an apparatus and second information about the apparatus for discovery; a processing system configured to discover the apparatus based on the message; and a transmitter configured to communicate directly with the apparatus independent of using a central node.

Certain aspects of the present disclosure provide an apparatus for wireless communications. The apparatus generally includes a processing system and a transceiver. The processing system is typically configured to discover one or more first apparatuses in a first range using a first procedure and to discover one or more second apparatuses in a second range greater than the first range using a second procedure different from the first procedure. The transceiver is generally configured to communicate directly with at least one of the discovered first or second apparatuses independent of using a central node.

Certain aspects of the present disclosure provide a method for wireless communications. The method generally includes discovering one or more first apparatuses in a first range using a first procedure, discovering one or more second apparatuses in a second range greater than the first range using a second procedure different from the first procedure, and communicating directly with at least one of the discovered first or second apparatuses independent of using a central node.

Certain aspects of the present disclosure provide an apparatus for wireless communications. The apparatus generally includes means for discovering one or more first apparatuses in a first range using a first procedure, means for discovering one or more second apparatuses in a second range greater than the first range using a second procedure different from the first procedure, and means for communicating directly with at least one of the discovered first or second apparatuses independent of using a central node.

Certain aspects of the present disclosure provide a computer-program product for wireless communications. The computer-program product generally includes a computer-readable medium having instructions executable to discover one or more first apparatuses in a first range using a first procedure, to discover one or more second apparatuses in a second range greater than the first range using a second procedure different from the first procedure, and to communicate directly with at least one of the discovered first or second apparatuses independent of using a central node.

Certain aspects of the present disclosure provide a wireless node. The wireless node generally includes at least one antenna, a processing system, and a transceiver. The processing system is typically configured to discover one or more first apparatuses in a first range using a first procedure and to discover one or more second apparatuses in a second range greater than the first range using a second procedure different from the first procedure. The transceiver is generally configured to communicate directly with at least one of the discovered first or second apparatuses, via the at least one antenna, independent of using a central node.

Certain aspects of the present disclosure provide a first apparatus for wireless communications. The first apparatus generally includes a receiver configured to receive first information about (a service provided by or an application available at) a second apparatus and second information about the second apparatus for discovery and to receive a probe request from a third apparatus; and a transmitter configured to transmit, to the third apparatus in response to the probe request, a message indicating the first and second information.

Certain aspects of the present disclosure provide a method for wireless communications. The method generally includes receiving, at a first apparatus, first information about (a service provided by or an application available at) a second apparatus and second information about the second apparatus for discovery; receiving a probe request from a third apparatus; and transmitting, to the third apparatus in response to the probe request, a message indicating the first and second information.

Certain aspects of the present disclosure provide a first apparatus for wireless communications. The first apparatus generally includes means for receiving first information about (a service provided by or an application available at) a second apparatus and second information about the second apparatus for discovery, wherein the means for receiving is configured to receive a probe request from a third apparatus; and means for transmitting, to the third apparatus in response to the probe request, a message indicating the first and second information.

Certain aspects of the present disclosure provide a computer-program product for wireless communications. The computer-program product generally includes a computer-readable medium having instructions executable to receive, at a first apparatus, first information about (a service provided by or an application available at) a second apparatus and second information about the second apparatus for discovery; to receive a probe request from a third apparatus; and to transmit, to the third apparatus in response to the probe request, a message indicating the first and second information.

Certain aspects of the present disclosure provide a wireless node. The wireless node generally includes at least one antenna; a receiver configured to receive, via the at least one antenna, first information about (a service provided by or an application available at) a first apparatus and second information about the first apparatus for discovery and to receive a probe request from a second apparatus; and a transmitter configured to transmit, to the second apparatus in response to the probe request, a message indicating the first and second information.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
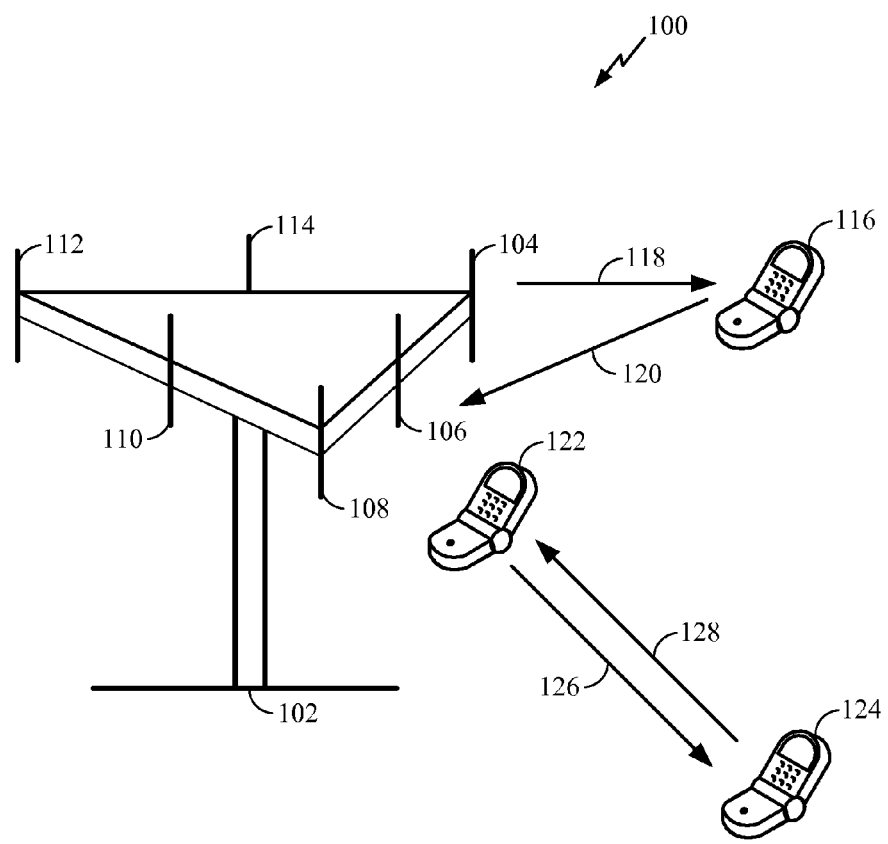
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station ("MS"), a remote station, a remote terminal, a user terminal ("UT"), a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium.

Referring now to FIG. 1, illustrated is a wireless communication system 100 in accordance with various aspects of the present disclosure. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which may in turn comprise a plurality of components associated with signal transmission and reception (e.g., processors, modulators, multiplexers, demodulators, demultiplexers, antennas, and so forth), as will be appreciated by one skilled in the art. Additionally, base station 102 may be a home base station, a femto base station, and/or the like.

Base station 102 may communicate with one or more devices such as device 116; however, it is to be appreciated that base station 102 may communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 may utilize a different frequency band than that used by reverse link 120, for example. Further, in a time division duplex (TDD) system, forward link 118 and reverse link 120 may utilize a common frequency band.

In addition, devices 122 and 124 may be communicating with one another, such as in a peer-to-peer configuration. Moreover, device 122 is in communication with device 124 using links 126 and 128. In a peer-to-peer ad hoc network, devices within range of each other, such as devices 122 and 124, may communicate directly with each other without a base station 102 and/or a wired infrastructure to relay their communication. Additionally, peer devices or nodes may relay traffic. The devices within the network communicating in a peer-to-peer manner may function similar to base stations and relay traffic or communications to other devices, until the traffic reaches its ultimate destination. The devices may also transmit control channels, which carry information that can be utilized to manage the data transmission between peer nodes.

A communication network may include any number of devices or nodes that are in wireless (or wired) communication. Each node may be within range of one or more other nodes and may communicate with the other nodes or through utilization of the other nodes, such as in a multi-hop topography (e.g., communications may hop from node to node until reaching a final destination). For example, a sender node may wish to communicate with a receiver node. To enable packet transfer between sender node and receiver node, one or more intermediate nodes may be utilized. It should be understood that any node may be a sender node and/or a receiver node and may perform functions of either sending and/or receiving information at substantially the same time (e.g., may broadcast or communicate information at about the same time as receiving information) or at different times.

System 100 may be configured to allow nodes that have initiated a communication session over a network to move the session to a direct connection. Nodes that are directly connected may exchange packets natively without any encapsulation. In accordance with some aspects, a "homeless" node may switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some aspects, nodes may be mobile (e.g., wireless), static (e.g., wired), or combinations thereof (e.g., one node static and a second node mobile, both nodes mobile, and so forth).

Figure 2:
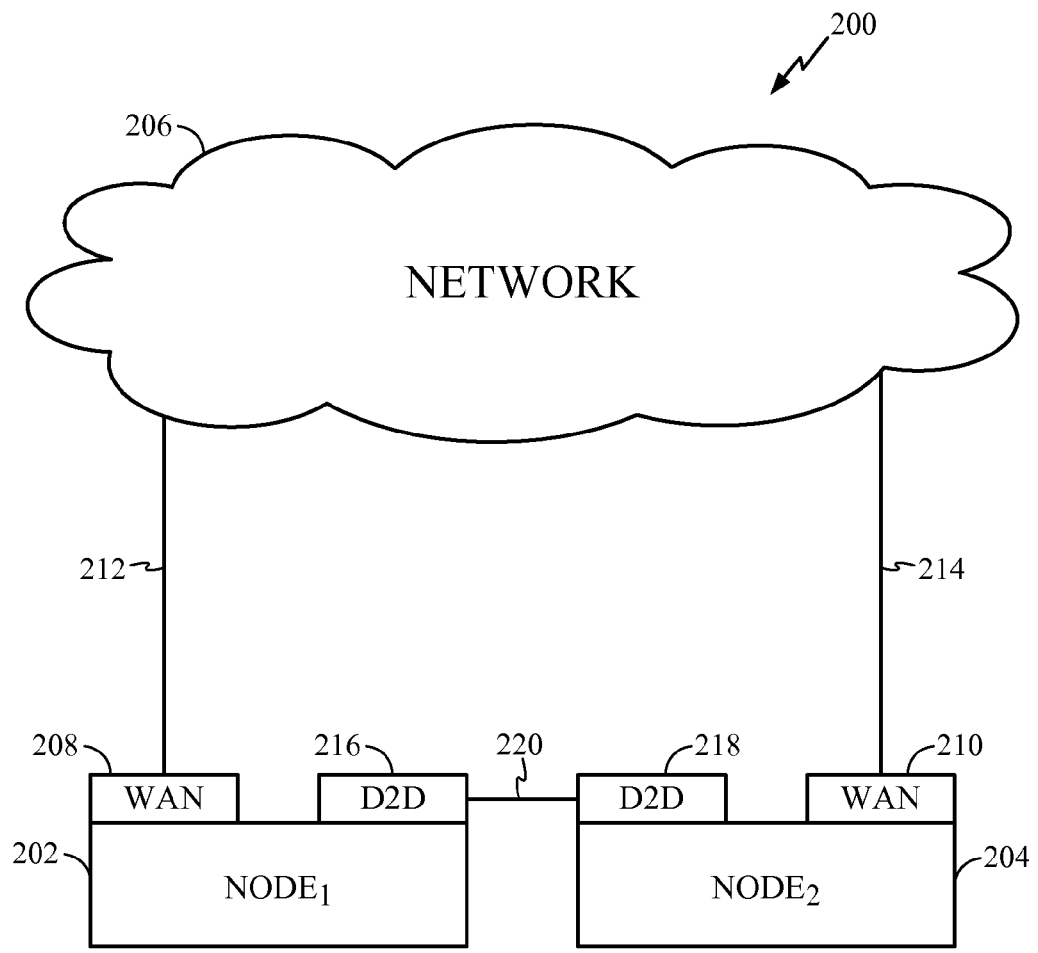
FIG. 2 illustrates a system that allows two nodes to communicate in accordance with certain aspects of the present disclosure.

FIG. 2 illustrates a system 200 that allows two nodes to communicate over a Wide Area Network interface and/or a Device-to-Device interface, according to various aspects. Included in system 200 are a first node (Node 1) 202 and a second node (Node2) 204. Each node 202, 204 includes at least two interfaces. A first interface may be connected to a network 206 that provides Internet Protocol (IP) addresses. For example, the network may be a Wide Area Network (WAN), a Local Area Network (LAN), a home network, Digital Subscriber Line (DSL), cable, 3GPP-based, 3GPP2-based, or any other technology providing interconnectivity and routing to a network of interest (e.g., the Internet).

Interfaces of nodes 202 and 204 may be wired (e.g., Device to Device), wireless (e.g., WAN), or combinations thereof. For example, Node$_1$ 202 interface may be wireless, and Node$_2$ 204 interface may be wired. As alternatives, Node$_2$ 204 interface may be wireless, Node$_1$ 202 interface may be wired, both interfaces may be wireless, or both interfaces may be wired.

For illustration purposes, the first interface of each node 202, 204 is a WAN interface 208, 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network may be a Wireless Local Area Network (WLAN) or another device-to-device (e.g., peer-to-peer) technology. For illustration purposes, the second interface of each node 202, 204 is illustrated as a Device-to-Device (D2D) interface 216, 218. The D2D interfaces 216, 218 allow nodes 202, 204 to perform direct communications, illustrated by direct link 220.

A procedure according to various aspects for starting a session over network 206 and moving to a direct session (e.g., over direct link 220) will now be described. For example purposes, it is assumed that Node$_1$ 202 utilizes Mobile Internet Protocol (IP). Communications are performed by Node$_1$ 202 utilizing its Mobile IP home address as a source address. A home address is a unicast routable address assigned to a node and is used as the permanent address of the node. Node$_s$ 202 communicates with Node$_2$ 204 over network 206 (e.g., WAN) by sending and receiving packets over respective first interfaces (e.g., WAN interfaces 208, 210). The packets may be encapsulated in a MIPv6 tunnel to a home agent, which may be included in network 206 according to various aspects, or a route optimization tunnel directly to node$_2$ 204.

Figure 3:
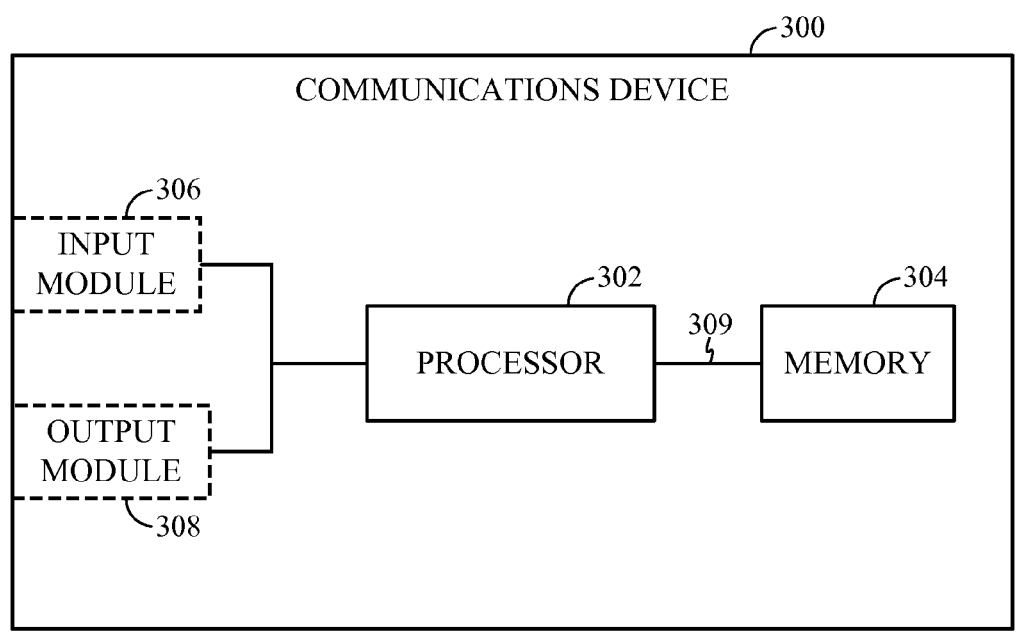
FIG. 3 illustrates an example of a communication device in accordance with certain aspects of the present disclosure.

FIG. 3 illustrates an exemplary first communications device 300, in accordance with an exemplary aspect. Exemplary first communications device 300 is, e.g., one of the wireless communications devices (base station 102 or devices 116, 122, 124) of FIG. 1 or one of the wireless communications devices (nodes 202, 204) of FIG. 2.

First communications device 300 includes a processor 302 and memory 304 coupled together via a bus 309 over which the various elements (e.g., processor 302 and memory 304) may exchange data and information. Communications device 300 further includes an input module 306 and an output module 308 which may be coupled to processor 302 as shown. However, in some aspects, the input module 306 and output module 308 are located internal to the processor 302.

Input module 306 may receive input signals. Input module 306 may include a wireless receiver and/or a wired or optical input interface for receiving input. Output module 308 may include a wireless transmitter and/or a wired or optical output interface for transmitting output.

Processor 302 is configured to receive a first signal from a second communications device; to generate a first application alert if said first signal satisfies an application alert criteria; and to receive a second signal from an access point, said second signal carrying second communications device information based on a previous signal from the second communications device. The access point may be a base station. For certain aspects, the second communications device information is location information. For certain aspects, processor 302 is configured to receive said first signal via a wireless peer-to-peer interface as part of being configured to receive a first signal. For certain aspects, processor 302 is configured to receive the second signal via a wireless wide area network interface as part of being configured to receive the second signal.

Processor 302 is further configured to determine an operation to take based on the second communications device information included in the second signal and information included in said first signal. For certain aspects, said second communications device information included in the second signal is information on a previous location of said second communications device, said information included in the first signal is current location information, and said operation is one of a location-based traffic update operation and a location-based advertisement update operation. Processor 302, for certain aspects, is further configured to send an information request signal to the access point requesting information corresponding to the second communications device, in response to the generated first application alert.

Example P2P Device Discovery Enhancements

WiFi Alliance (WFA) Direct (or simply "WiFi Direct") is a peer-to-peer (P2P) specification, developed under the WiFi Alliance (WFA), which provides a means for IEEE 802.11 devices to discover and communicate directly with each other without using a central node, such as an access point (AP) or a base station (BS). The central node may also be referred to as a Node B, Radio Network Controller (RNC), evolved Node B (eNB), base station controller (BSC), base transceiver station (BTS), transceiver function (TF), radio router, radio transceiver, Basic Service Set (BSS), Extended Service Set (ESS), radio base station (RBS), or some other terminology. WFA Direct is intended to allow WiFi devices, called P2P Devices, to address usage models that are covered traditionally by Bluetooth and ad hoc networks, such as an independent basic service set (IBSS). WFA Direct addresses device discovery, service discovery, security, user set-up and cross-connection to the infrastructure network.

Example use cases for WFA Direct may include the following: (1) show multimedia (video, pictures, etc) from a cell phone to a television (TV), a personal computer (PC) to the TV, or a camera to the TV; (2) show multimedia from a set-top-box (STB) to a TV or PC or show from the cell phone to the STB; (3) share files and content between any two devices with WiFi, such as a PC, a cell phone, a camera, a projector, a car media center, a kiosk, or a network drive; and (4) print files from any device to a printer. WFA Direct features may include: a range equivalent to standard WiFi, security using WPA2 (e.g., Advanced Encryption Standard (AES) encryption), three 20 MHz channels in the 2.4 GHz band and twenty-five 20 MHz channels in the 5 GHz band, device authentication and enrollment with Wi-Fi Protected Setup (WPS) (or Wi-Fi Simple Configuration (WSC)), an IP-address-based protocol, service advertisement, power management allowing both devices to sleep, one-time or persistent connections, and concurrency with infrastructure networks (i.e., networks using a central node, such as an AP).

In WFA direct, a "P2P device" generally refers to a device that supports the WFA Direct specification. A group owner (GO) may act as the P2P master device and may be able to connect multiple P2P clients. The GO has functionality similar to an AP in a traditional system, except that the GO can enter a power save. Wi-Fi Protected Set-up (WPS2.0) is supported by a P2P device, and that device supports the Wireless Simple Configuration (WSC) modes of PIN (personal identification number) (e.g., keypad, label, etc.) and PBC (push button configuration). A P2P Group typically has a single BSSID (basic service set identifier), a single GO, one or more P2P clients, and a single P2P Group ID. This group may be a one-time group or a persistent group.

P2P devices discover other P2P devices through either the Scan phase or the Find phase. Scanning (or the Scan phase) may be performed by a P2P device in an effort to discover existing P2P networks. Existing networks have a GO sending out beacons which may be heard by a P2P device that listens to all available channels. Active Scan or Passive Scan is possible. Passive Scan is accomplished by dwelling on all channels and listening for beacons. Active Scan involves sending probe requests on all channels and soliciting probe responses from an AP or a GO.

The Find phase is used to discover other P2P devices that are not part of a P2P Group. In the Find phase, there are two states: Search state and Listen state. In the Search state, a P2P device may transmit one or more probe request frames on each social channel (e.g., channel 1, 6, and 11 in the 2.4 GHz band). The probe request frame may contain a P2P IE (information element), a WSC IE (including Primary Device Type), a service set identifier (SSID) equal to P2P Wildcard SSID, and a BSSID equal to the Wildcard BSSID. The receiver address may be either the broadcast address or the device address of the listening P2P device. In the Listen state, a P2P device may wait on a specific social channel (e.g., the Listen channel) and may listen for probe requests of a certain type. A P2P device may monitor a specific social channel looking for probe requests containing a P2P IE, a P2P Wildcard SSID, a Wildcard BSSID, and a matching receiver address. A device may filter the requests based on desired device type value or device address. Probe responses may be sent with contents including one or more P2P IEs and a human-readable device specification in the WSC IE.

There are restrictions on the device in Listen state during the Find phase. Devices (in the Find phase) may most likely listen for a specific time period, typically between 100 ms and 300 ms per channel, and be constantly available during these periods. Devices (not in the Find phase) may stay in the Listen state for an extended period. It is recommended that devices remain in the Listen state a contiguous 500 ms every 5 seconds. Shorter Listen state duration may result in lengthened or unreliable device discovery.

Current WFA Direct discovery protocol involves stations (STAs) searching for each other by cycling through a search phase on three different (so-called "social") channels and remaining in the Listen state for a random time, which is typically a multiple of 100 ms. The random duration ensures that two STAs will not synchronize their search and listen phases and thereby never discover each other. However, there are certain drawbacks to this procedure. For example, searching through three different channels extends the discovery duration. Typically, discovery takes approximately 500 ms. This large discovery time causes devices to consume more power, thereby deteriorating battery life. As another example, the discovery of a device currently is followed up by a separate service discovery phase to ascertain the particular services provided by the device, which increases the discovery time. Furthermore, the discovery procedure only allows for discovery of devices within the WLAN range and thereby limits the number of devices discovered.

Accordingly, what is needed are techniques and apparatus with enhanced discovery procedures in order to reduce the discovery time, reduce the power consumption incurred by devices due to discovery, and/or increase the discovery range.

For certain aspects, P2P devices may be programmed with a particular time (e.g., a predetermined time) to wake up for a discovery period common among the P2P devices, during which probe requests may be transmitted and/or received. Time stamps may be obtained via any of various suitable methods, such as GPS, in-band signaling from a central device (e.g., an AP), cellular, etc.

For certain aspects, a P2P device may be configured to use less than three channels for discovery. For example, a P2P device may be programmed with a fixed channel (i.e., a single common channel) to transmit or receive for the purpose of discovery. This common channel may be a licensed channel or an unlicensed channel (i.e., a channel having a bandwidth in an unlicensed spectrum, such as the unused frequency spectrum in the television band, also known as the television white space (TVWS), with frequencies ranging from about 698 to 806 MHz, for example, or any frequency band(s) that a radio frequency regulatory entity, such as the Federal Communications Commission (FCC) in the United States, has not yet licensed or does not require a license). The channel may be programmed by a device manufacturer, a WAN service provider, or a social network service provider, for example. Devices may wake up on the programmed channel, transmit probe requests, and respond to probe requests from other devices that are in the discovery mode. Devices may also wake up on the programmed channel and transmit a beacon using the contention procedure indicating presence and type of device. By using only one or two channels rather than the typical three channels for discovery, discovery duration may be reduced, which in turn, may reduce power consumption of the P2P device and increase battery life.

To enhance service discovery, devices may provide (e.g., in their probe response or beacon) an additional code or compressed indication that provides information about the type of services or applications that are available at the device. For certain aspects, this indication may consist of a few bits, such as 8 bytes (64 bits) or 16 bytes (128 bits). For example, a first communications device may send a 64- or 128-bit message to a second communications device informing the second communications device that the first communications device (e.g., Smartphone X) is running application Y. As a more specific example, a device operated by a vendor selling coffee may include the code for "coffee" in the probe response or beacon. The code used may be pre-programmed into the device by a manufacturer for different types of services.

For certain aspects, a hierarchical discovery procedure may be employed. For example, if further discovery information is desired after the message for unified service+device discovery is received, a more detailed discovery message exchange (e.g., with messages indicating an internet protocol (IP) address, a port, authentication, etc.) may occur.

In an effort to increase the device discovery range, WLAN devices may discover devices beyond their WLAN radio range using a backhaul network. To do so, WLAN devices may associate with an AP or a WiFi Direct group owner (GO) that has a backhaul. The WLAN device may use a network-wide discovery protocol to advertise its services. In discovery request messages sent over a backhaul link, a WLAN device may indicate all devices that the WLAN device has received responses from using a direct wireless connection, thereby avoiding unnecessary responses from devices that have already been discovered.

In an effort to reduce power consumption due to discovery, WLAN devices may associate with a GO and provide all information regarding services provided by the device to the GO. The probe response message sent in response to probe requests from another WLAN device may contain the device and service information of all WLAN devices associated with the GO.

For certain aspects, a GO may accumulate the device information from other GOs within its communication range and store this information. Such a GO may thereby provide information of its own associated devices and of other devices that are in the vicinity of the GO. For certain aspects, the service+ device capabilities of all devices within a certain range may be periodically advertised by the GO (e.g., an AC-powered GO). The GO may obtain the service+device information from a backhaul or when a device associates with the GO. A GO may also send probe requests to retrieve information about devices associated with other GOs and store this retrieved information. This may increase the device discovery range.

For certain aspects, physical (PHY) layer discovery may occur for in-range devices. This PHY layer discovery may utilize a P2P protocol, such as WiFi Direct, for certain aspects. For those devices that cannot be discovered with the WiFi Direct discovery protocol, however, Layer 3 (L3) discovery may be employed to discover such devices. For certain aspects, the L3 discovery procedure may involve use of service discovery software, such as Bonjour, Devices Profile for Web Services (DPWS), or Universal Plug and Play (UPnP).

For certain aspects, a WLAN device may be equipped with a longer range PHY layer technology, for example, that uses a repetition mode for the purpose of discovering other devices that are at a long range. This longer range technology may involve using Extended Range (XR), Super Long Range (SLR), or IEEE 802.11b transmission mode. These longer range technologies may include using a power amplifier with increased transmission power or specially shaped directional antennas, for example, to achieve connectivity at distances over several kilometers.

Figure 4:
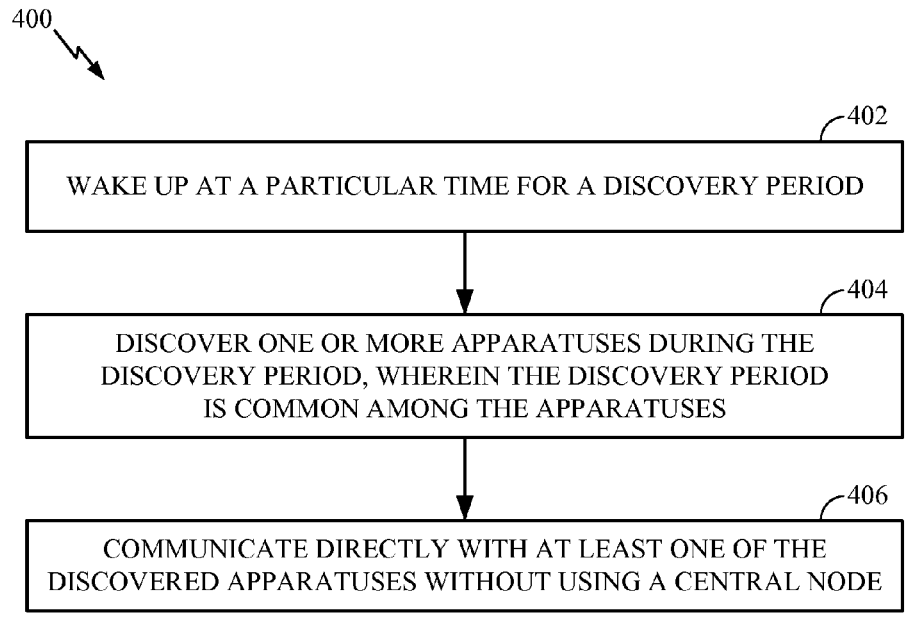
FIG. 4 is a flow diagram of example operations for discovery of one or more apparatuses via one or two channels, in accordance with certain aspects of the present disclosure.

FIG. 4 is a flow diagram of example operations 400 for discovery of an apparatus through a common channel and subsequently communicating without using a central node, such as an access point (AP) or a base station (BS). The operations 400 may be performed from the perspective of a STA (also known as a client, an access terminal, or a user terminal). At 402, the STA may wake up at a particular time for a discovery period. At 404, the STA may discover one or more apparatuses (e.g., other STAs) during the discovery period, wherein the discovery period is common among the apparatuses.

For certain aspects, the STA may discover the apparatuses via only one or only two channels. For certain aspects, the only one or only two channels may comprise a single channel common among the apparatuses and the STA and designated for discovery. This common channel may have a bandwidth in an unlicensed spectrum. For certain aspects, the common channel may be a WiFi Direct social channel.

At 406, the STA may communicate directly with at least one of the discovered apparatuses without using a central node. For certain aspects, the STA may communicate with the at least one of the discovered apparatuses via a peer-to-peer (P2P) protocol, such as a WiFi Alliance (WFA) Direct protocol.

According to certain aspects, the STA may transmit a probe request via the common channel during the discovery period. The STA may receive a response to the probe request from one of the apparatuses via the common channel during the discovery period. For certain aspects, the STA may receive a beacon from one of the apparatuses during the discovery period and may determine a device type for the one of the apparatuses based on the beacon. For certain aspects, the STA may transmit a beacon indicating a device type.

Figure 5:
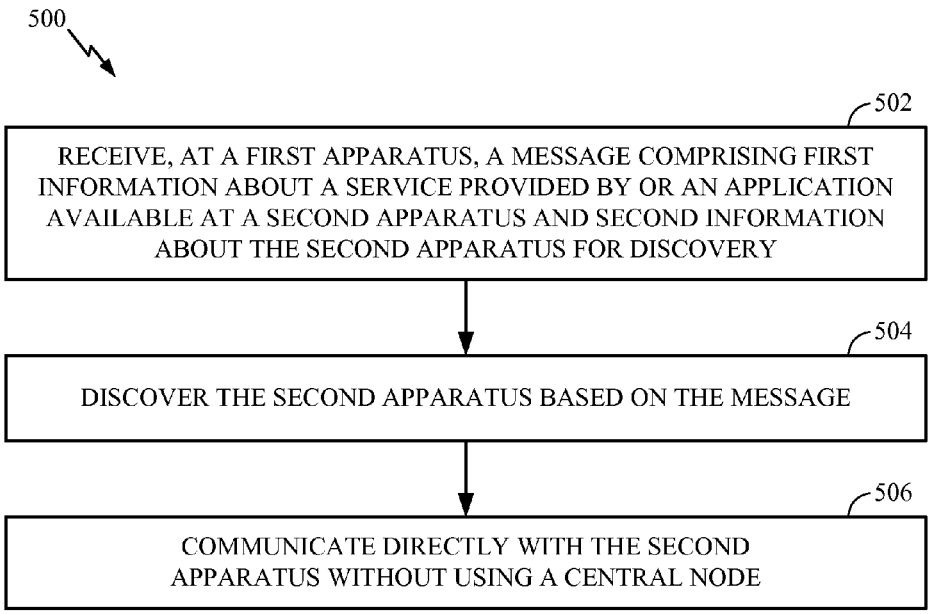
FIG. 5 is a flow diagram of example operations for receiving a message comprising two sets of information for discovery, in accordance with certain aspects of the present disclosure.
Figure 5A:
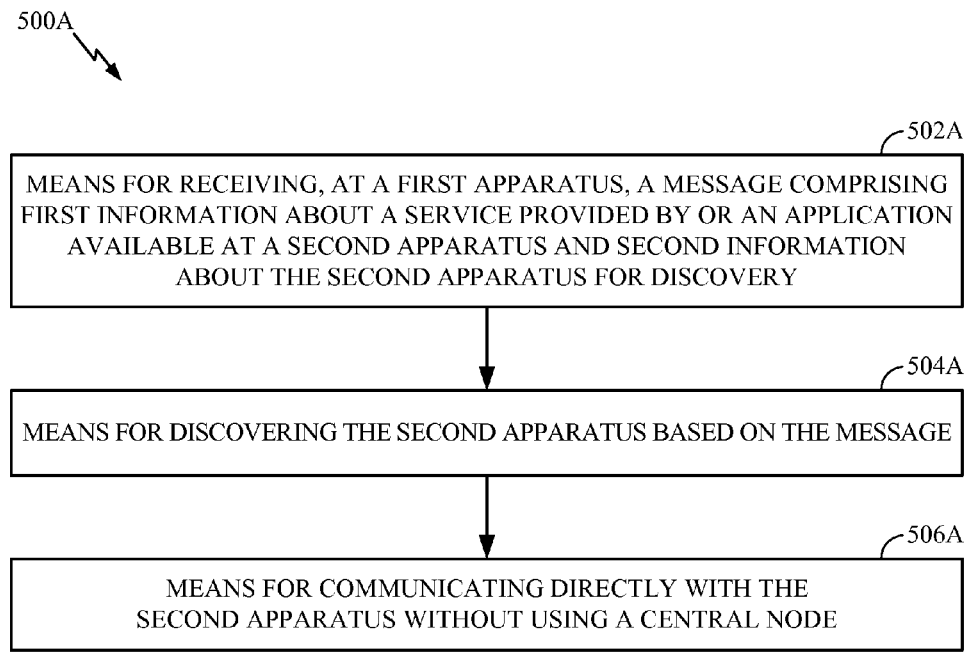
FIG. 5A illustrates example means for performing the operations illustrated in FIG. 5.

FIG. 5 is a flow diagram of example operations 500 for receiving a message comprising two sets of information for discovery and subsequently communicating, without using a central node. The operations 500 may be performed from the perspective of a first apparatus, such as a STA. At 502, the first apparatus may receive a message comprising first information about a service provided by or an application available at a second apparatus (e.g., another STA) and second information about the second apparatus for discovery. For certain aspects, the first apparatus may receive the message via a common channel (i.e., a channel common with the second apparatus). For certain aspects, the message comprises a compressed indication of the service or the application. For certain aspects, the message comprises 64 bits or 128 bits.

At 504, the first apparatus may discover the second apparatus based on the message. At 506, the first apparatus may communicate directly with the second apparatus without using a central node. For certain aspects, the first apparatus may communicate directly with the second apparatus via a P2P protocol (e.g., a WFA Direct protocol).

According to certain aspects, the first apparatus may receive one or more messages from the second apparatus for additional discovery after receiving the message. These messages for additional discovery may comprise an indication of at least one of an internet protocol (IP) address, a port, or authentication information.

For certain aspects, the first apparatus may wake up at a particular time for a common discovery period. According to certain aspects, the first apparatus may transmit a probe request during the discovery period and may receive a response to the probe request from the second apparatus during the discovery period, the response comprising the message. For certain aspects, the first apparatus may receive a beacon from the second apparatus during the discovery period, the beacon comprising the message.

According to certain aspects, the first apparatus may receive the message from another apparatus that periodically advertises the first and second information associated with the second apparatus. The other apparatus may be a group owner (GO), wherein the second apparatus is associated with the GO.

Figure 6:
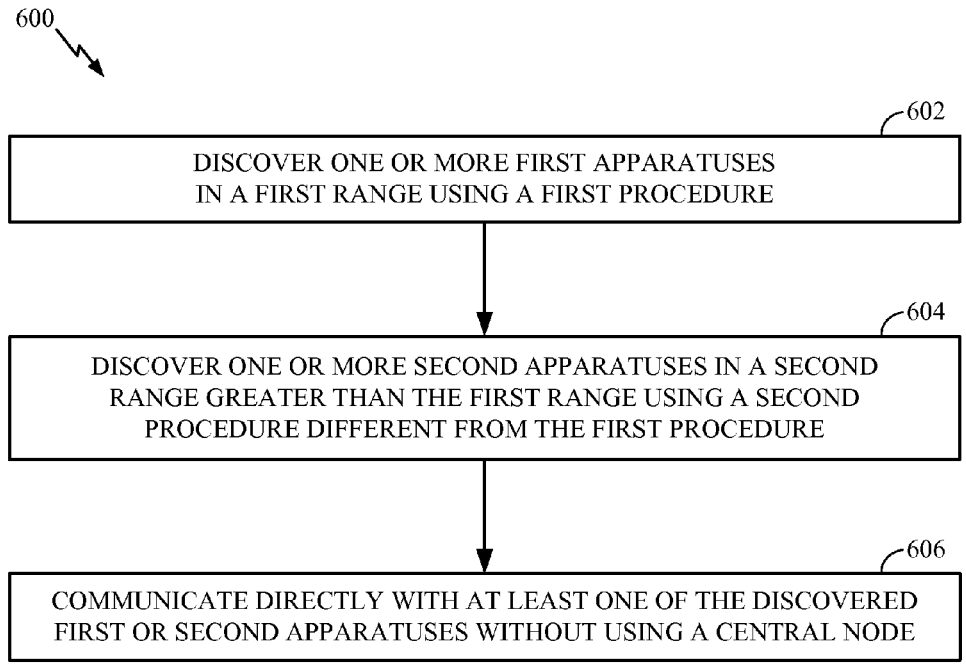
FIG. 6 is a flow diagram of example operations for the discovery of one or more apparatuses using two different procedures for discovery in two different ranges, in accordance with certain aspects of the present disclosure.
Figure 6A:
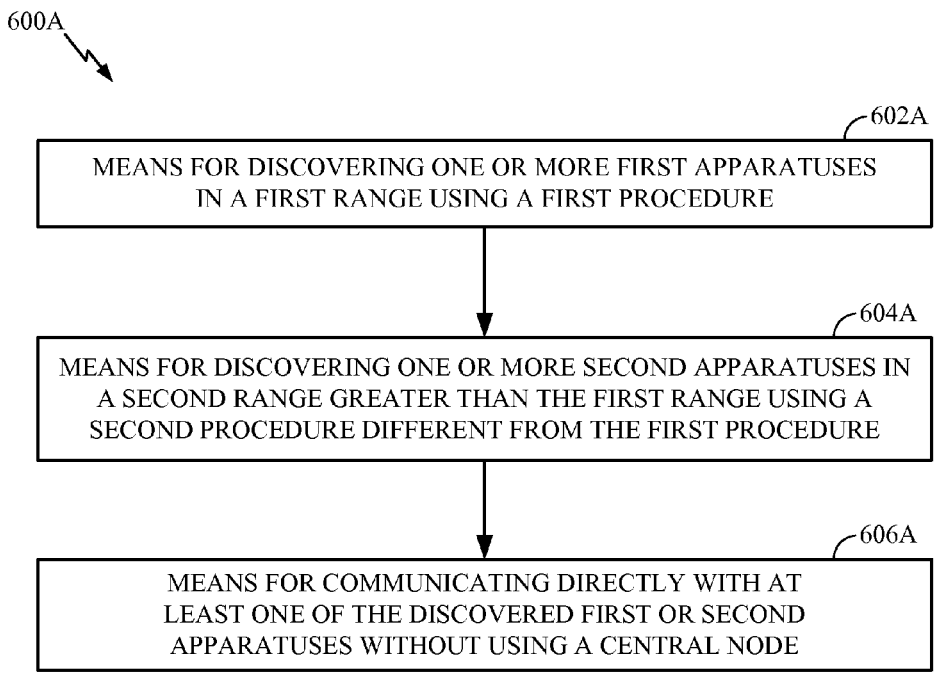
FIG. 6A illustrates example means for performing the operations illustrated in FIG. 6.

FIG. 6 is a flow diagram of example operations 600 for the discovery of one or more apparatuses using two different procedures for discovery in two different ranges and subsequently communicating without using a central node. The operations 600 may be performed from the perspective of a STA. At 602, the STA may discover one or more first apparatuses (e.g., other STAB) in a first range using a first procedure. At 604, the STA may discover one or more second apparatuses in a second range using a second procedure different from the first procedure. The second range is greater than the first range.

At 606, the STA may communicate directly with at least one of the discovered first or second apparatuses without using a central node (e.g., using Wi-Fi Direct). For certain aspects, STA may communicate with the at least one of the discovered first and second apparatuses via a P2P protocol (e.g., a WFA Direct protocol).

According to certain aspects, the first procedure comprises using a WiFi Direct discovery procedure. For certain aspects, the first procedure comprises discovering the one or more first apparatuses via a single channel common among the first apparatuses and designated for discovery. For certain aspects, the second procedure comprises a Layer 3 (L3) discovery procedure, which may comprise using service discovery software. The service discovery software may include Bonjour, Devices Profile for Web Services (DPWS), or Universal Plug and Play (UPnP). For certain aspects, the second procedure comprises using at least one of eXtended Range (XR) or Super Long Range (SLR). According to certain aspects, the second procedure includes associating with another apparatus having a backhaul link to a network and discovering the second apparatuses via the backhaul link.

Figure 7:
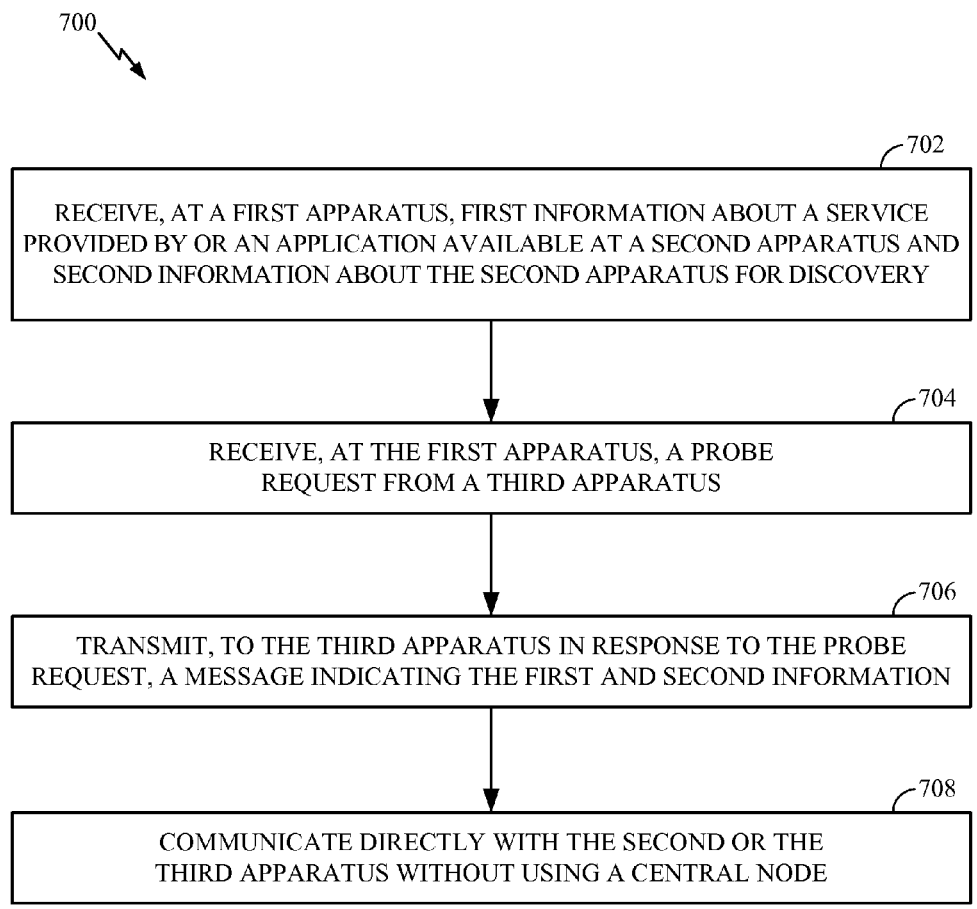
FIG. 7 is a flow diagram of example operations for sharing two sets of information about an apparatus with another apparatus, in accordance with certain aspects of the present disclosure.
Figure 7A:
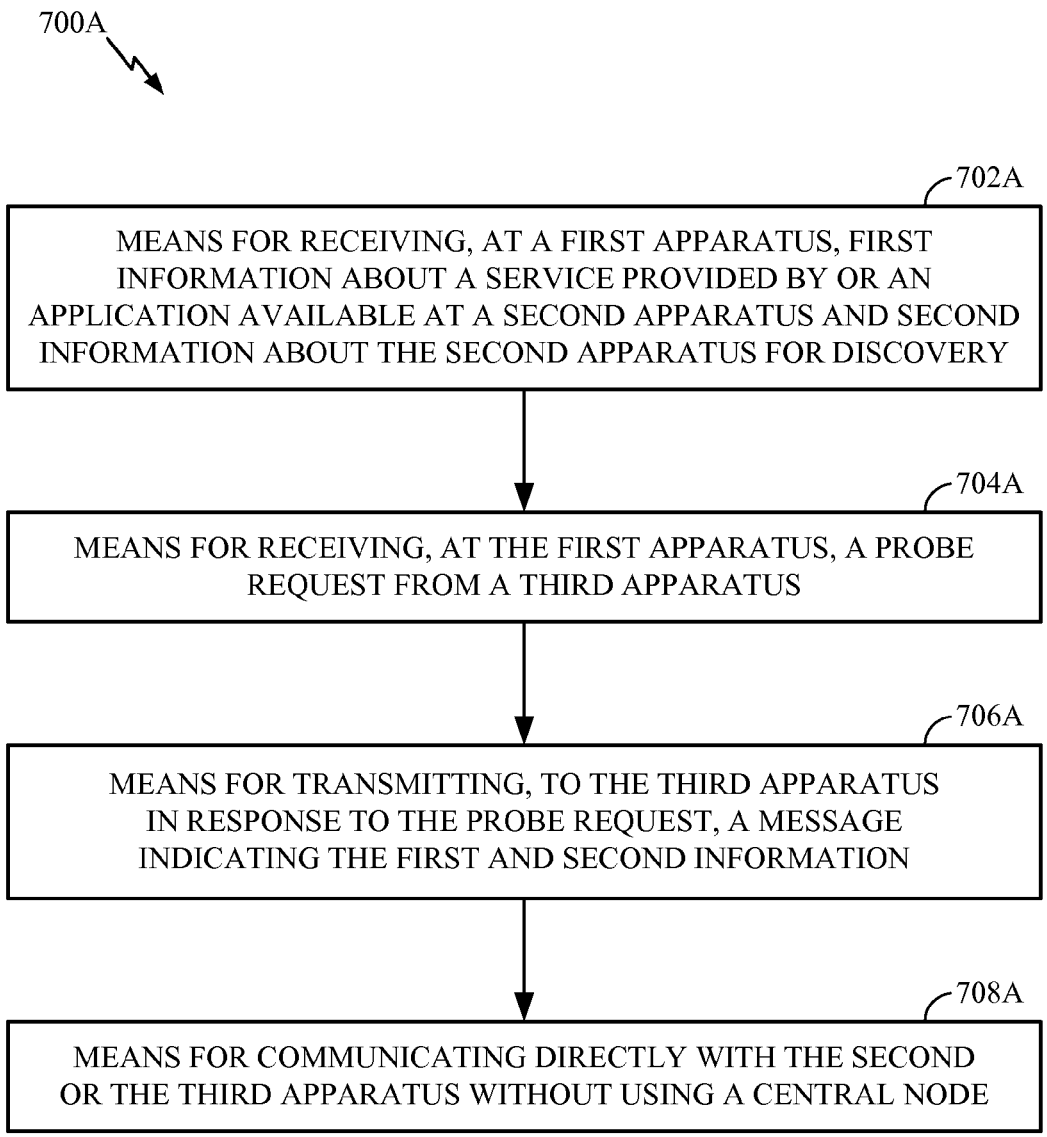
FIG. 7A illustrates example means for performing the operations illustrated in FIG. 7.

FIG. 7 is a flow diagram of example operations 700 for sharing two sets of information about an apparatus with another apparatus and subsequently communicating without using an AP or other central node. The operations 700 may be performed from the perspective of a first apparatus, which may be a STA functioning as a group owner (GO). The GO may be an AC-powered GO.

At 702, the first apparatus may receive first information about a service provided by or an application available at a second apparatus (e.g., a STA) and second information about the second apparatus for discovery. For certain aspects, the second apparatus may be associated with the first apparatus. The first apparatus may receive a probe request from a third apparatus (e.g., another STA, which may also function as a GO) at 704. At 706, the first apparatus may transmit, to the third apparatus in response to the probe request, a message indicating the first and second information.

For certain aspects, the first apparatus may communicate directly with the second or the third apparatus without using a central node at 708. For certain aspects, the first apparatus may communicate with the second or the third apparatus via a peer-to-peer (P2P) protocol (e.g., a WFA Direct protocol). For other aspects, the first apparatus may communicate with an AP with which the second or the third apparatus is associated.

According to certain aspects, the first apparatus may transmit another probe request to the third apparatus; receive, from the third apparatus in response to the other probe request, another message comprising third information about a service provided by or an application available at a fourth apparatus and fourth information about the fourth apparatus for discovery; and store the third and fourth information about the fourth apparatus. For certain aspects, the fourth apparatus is associated with the third apparatus. For certain aspects, the first apparatus may receive yet another probe request from a fifth apparatus and may transmit, to the fifth apparatus, yet another message indicating at least one of the first and second information or the third and fourth information.

Figure 4A:
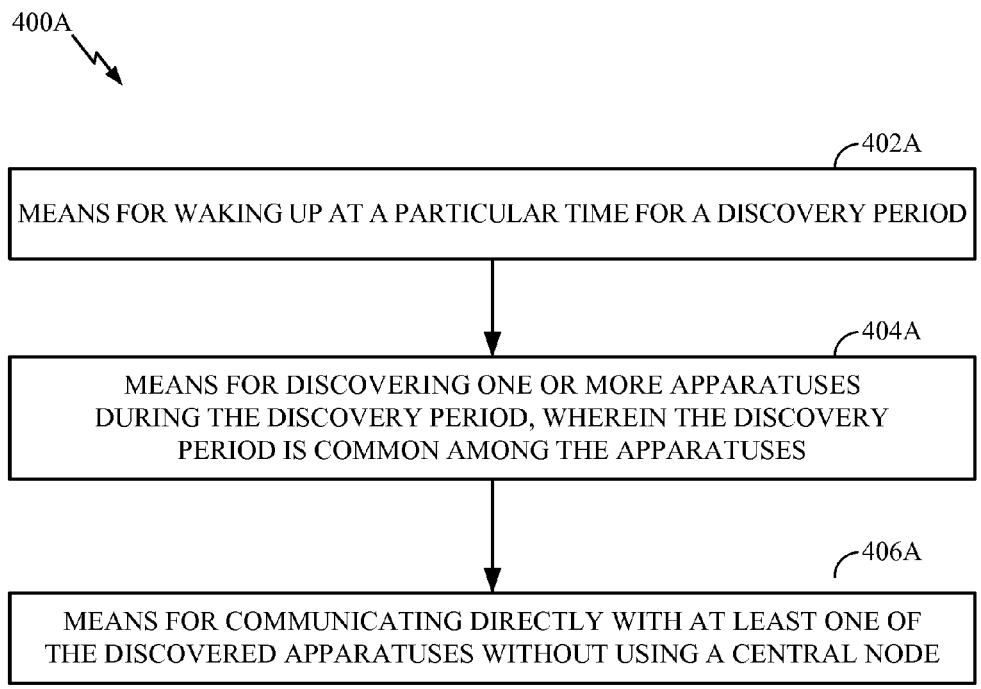
FIG. 4A illustrates example means for performing the operations illustrated in FIG. 4.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A.

As a more specific example, means for transmitting may comprise an output module 308 with a wireless transmitter as illustrated in FIG. 3. Means for receiving may comprise an input module 306 with a wireless receiver as illustrated in FIG. 3. Means for communicating may comprise the input and/or output modules 306, 308 of FIG. 3. Means for determining, means for discovering, means for processing, and/or means for waking up may comprise a processing system, such as the processor 302 illustrated in FIG. 3. Means for storing may comprise a memory, such as the memory 304 of FIG. 3 and/or a processing system, such as the processor 302 illustrated in FIG. 3.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
 a processing system configured to:
  wake up the first apparatus at a particular time for a discovery period; and
  discover one or more second apparatuses during the discovery period, wherein the discovery period is common among the first and second apparatuses; and
 a transceiver configured to transmit, during the discovery period, information about a service provided by or an application available at the first apparatus and receive a response from at least one of the second apparatuses based on the information and to communicate directly with at least one discovered second apparatus independent of using a central node.

2. The first apparatus of claim 1, wherein the processing system is configured to discover the second apparatuses via only one or only two channels.

3. The first apparatus of claim 2, wherein the only one or only two channels comprise a single channel common among the first and second apparatuses and designated for discovery.

4. The first apparatus of claim 3, wherein the common channel has a bandwidth in an unlicensed spectrum.

5. The first apparatus of claim 3, wherein the transceiver is configured to:
 transmit a probe request via the common channel during the discovery period; and
 receive a response to the probe request from one of the second apparatuses via the common channel during the discovery period.

6. The first apparatus of claim 1, wherein the transceiver is configured to receive a beacon from one of the second apparatuses during the discovery period and wherein the processing system is configured to determine a device type for the one of the second apparatuses based on the beacon.

7. The first apparatus of claim 1, wherein the transceiver is configured to communicate with the at least one discovered second apparatus via a peer-to-peer (P2P) protocol.

8. A method performed by an apparatus for wireless communications, comprising:
 waking up at a particular time for a discovery period;
 discovering one or more other apparatuses during the discovery period, wherein the discovery period is common among the other apparatuses;
 transmitting, during the discovery period, information about a service provided by or an application available at the apparatus and receiving a response from at least one of the other apparatuses based on the information; and
 communicating directly with at least one discovered other apparatus independent of using a central node.

9. The method of claim 8, wherein the discovering comprises discovering the other apparatuses via only one or only two channels.

10. The method of claim 9, wherein the only one or only two channels comprise a single channel common among the other apparatuses and designated for discovery.

11. The method of claim 10, wherein the common channel has a bandwidth in an unlicensed spectrum.

12. The method of claim 10, further comprising:
transmitting a probe request via the common channel during the discovery period; and
receiving a response to the probe request from one of the other apparatuses via the common channel during the discovery period.

13. The method of claim 8, further comprising:
receiving a beacon from one of the other apparatuses during the discovery period; and
determining a device type for the one of the other apparatuses based on the beacon.

14. The method of claim 8, wherein the communicating comprises communicating directly with the at least one discovered apparatus via a peer-to-peer (P2P) protocol.

15. A first apparatus for wireless communications, comprising:
means for waking up the first apparatus at a particular time for a discovery period;
means for discovering one or more second apparatuses during the discovery period, wherein the discovery period is common among the first and second apparatuses;
means for transmitting, during the discovery period, information about a service provided by or an application available at the first apparatus and receiving a response from at least one of the second apparatuses based on the information
means for communicating directly with at least one discovered second apparatus independent of using a central node.

16. The first apparatus of claim 15, wherein the means for discovering is configured to discover the second apparatuses via only one or only two channels.

17. The first apparatus of claim 16, wherein the only one or only two channels comprise a single channel common among the first and second apparatuses and designated for discovery.

18. The first apparatus of claim 17, wherein the common channel has a bandwidth in an unlicensed spectrum.

19. The first apparatus of claim 17, further comprising:
means for transmitting a probe request via the common channel during the discovery period; and
means for receiving a response to the probe request from one of the second apparatuses via the common channel during the discovery period.

20. The first apparatus of claim 15, further comprising:
means for receiving a beacon from one of the second apparatuses during the discovery period; and
means for determining a device type for the one of the second apparatuses based on the beacon.

21. The first apparatus of claim 15, wherein the means for communicating is configured to communicate with the at least one discovered second apparatus via a peer-to-peer (P2P) protocol.

22. A computer-program product for wireless communications, comprising a computer-readable medium comprising instructions executable to:
wake up an apparatus at a particular time for a discovery period;
discover one or more other apparatuses during the discovery period, wherein the discovery period is common among the other apparatuses;
transmit, during the discovery period, information about a service provided by or an application available at the apparatus and receive a response from at least one of the other apparatuses based on the information; and
communicate directly with at least one discovered other apparatus independent of using a central node.

23. A wireless node, comprising:
at least one antenna;
a processing system configured to:
wake up the wireless node at a particular time for a discovery period;
discover one or more apparatuses during the discovery period, wherein the discovery period is common among the apparatuses; and
a transceiver configured to transmit, during the discovery period, information about a service provided by or an application available at the first apparatus and receive a response from at least one of the second apparatuses based on the information and to communicate directly with at least one discovered apparatus, via the at least one antenna, independent of using a central node.

24. A first apparatus for wireless communications, comprising:
a receiver configured to receive information about a second apparatus for discovery, wherein the information comprises information about a service provided by or an application available at the second apparatus;
a processing system configured to discover the second apparatus based on the information; and
a transmitter configured to communicate directly with the second apparatus discovered based on the information independent of using a central node.

25. The first apparatus of claim 24, wherein the information is received as a compressed indication of the service or the application.

26. The first apparatus of claim 24, wherein the receiver is configured to receive one or more messages from the second apparatus for additional discovery after receiving the information.

27. The first apparatus of claim 26, wherein the one or more messages for additional discovery comprise an indication of at least one of an internet protocol (IP) address, a port, or authentication information.

28. The first apparatus of claim 24, wherein the information comprises 64 bits or 128 bits.

29. The first apparatus of claim 24, wherein the receiver is configured to receive the information via a common channel.

30. The first apparatus of claim 24, wherein the processing system is configured to wake up the first apparatus at a particular time for a discovery period common between the first and second apparatuses.

31. The first apparatus of claim 30, wherein the transmitter is configured to transmit a probe request during the discovery period and wherein the receiver is configured to receive a response to the probe request from the second apparatus during the discovery period, the response comprising the information.

32. The first apparatus of claim 30, wherein the receiver is configured to receive a beacon from the second apparatus during the discovery period, the beacon comprising the information.

33. The first apparatus of claim 24, wherein the receiver is configured to receive the information from a third apparatus that periodically advertises the information associated with the second apparatus.

34. The first apparatus of claim 24, wherein the transmitter is configured to communicate with the second apparatus via a peer-to-peer (P2P) protocol.

35. A method for wireless communications, comprising:
receiving information about an apparatus for discovery, wherein the information comprises information about a service provided by or an application available at the apparatus;
discovering the apparatus based on the information; and
communicating directly with the apparatus discovered based on the information independent of using a central node.

36. The method of claim 35, wherein the information is received as a compressed indication of the service or the application.

37. The method of claim 35, further comprising receiving one or more messages from the apparatus for additional discovery after receiving the information.

38. The method of claim 37, wherein the one or more messages for additional discovery comprise an indication of at least one of an internet protocol (IP) address, a port, or authentication information.

39. The method of claim 35, wherein the information comprises 64 bits or 128 bits.

40. The method of claim 35, wherein the receiving comprises receiving the information via a common channel.

41. The method of claim 35, further comprising waking up at a particular time for a common discovery period.

42. The method of claim 41, further comprising:
transmitting a probe request during the discovery period; and
receiving a response to the probe request from the apparatus during the discovery period, the response comprising the information.

43. The method of claim 41, further comprising receiving a beacon from the apparatus during the discovery period, the beacon comprising the information.

44. The method of claim 35, further comprising receiving the information from another apparatus that periodically advertises the information associated with the apparatus.

45. The method of claim 35, wherein the communicating comprises communicating directly with the apparatus via a peer-to-peer (P2P) protocol.

46. A first apparatus for wireless communications, comprising:
means for receiving information about a second apparatus for discovery, wherein the information comprises information about a service provided by or an application available at the second apparatus;
means for discovering the second apparatus based on the information; and
means for communicating directly with the second apparatus discovered based on the information independent of using a central node.

47. The first apparatus of claim 46, wherein the information is received as a compressed indication of the service or the application.

48. The first apparatus of claim 46, wherein the means for receiving is configured to receive one or more messages from the second apparatus for additional discovery after receiving the information.

49. The first apparatus of claim 48, wherein the one or more messages for additional discovery comprise an indication of at least one of an internet protocol (IP) address, a port, or authentication information.

50. The first apparatus of claim 46, wherein the information comprises 64 bits or 128 bits.

51. The first apparatus of claim 46, wherein the means for receiving is configured to receive the information via a common channel.

52. The first apparatus of claim 46, further comprising means for waking up the first apparatus at a particular time for a discovery period common between the first and second apparatuses.

53. The first apparatus of claim 52, further comprising means for transmitting a probe request during the discovery period, wherein the means for receiving is configured to receive a response to the probe request from the second apparatus during the discovery period, the response comprising the information.

54. The first apparatus of claim 52, wherein the means for receiving is configured to receive a beacon from the second apparatus during the discovery period, the beacon comprising the information.

55. The first apparatus of claim 46, wherein the means for receiving is configured to receive the information from a third apparatus that periodically advertises the information associated with the second apparatus.

56. The first apparatus of claim 46, wherein the means for communicating is configured to communicate with the second apparatus via a peer-to-peer (P2P) protocol.

57. A computer-program product for wireless communications, comprising a computer-readable medium comprising instructions executable to:
receive information about an apparatus for discovery, wherein the information comprises information about a service provided by or an application available at the apparatus;
discover the apparatus based on the information; and
communicate directly with the apparatus discovered based on the information independent of using a central node.

58. A wireless node, comprising:
at least one antenna;
a receiver configured to receive, via the at least one antenna, information about an apparatus for discovery, wherein the information comprises information about a service provided by or an application available at the apparatus;
a processing system configured to discover the apparatus based on the information; and
a transmitter configured to communicate directly with the apparatus discovered based on the information independent of using a central node.

* * * * *